United States Patent Office 3,444,589
Patented May 20, 1969

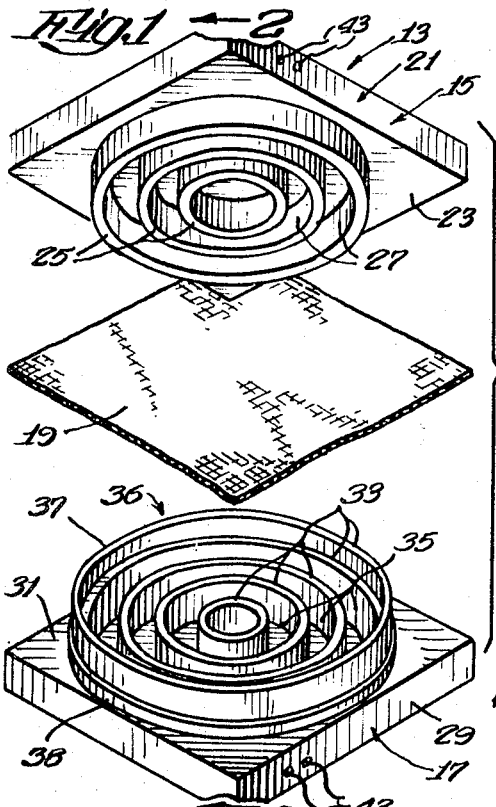
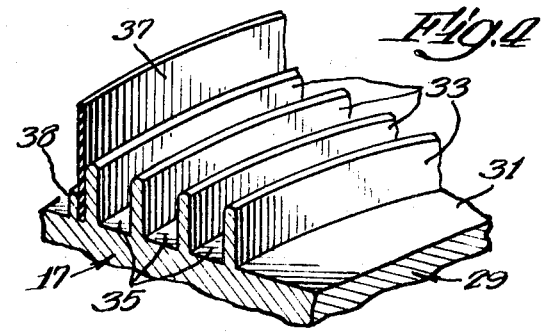
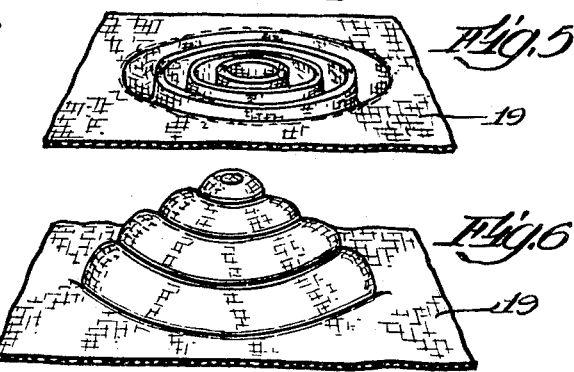
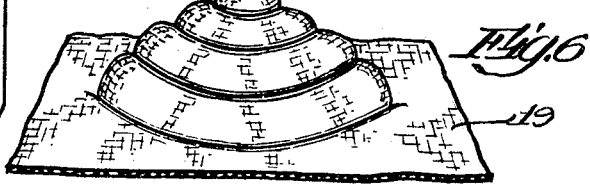
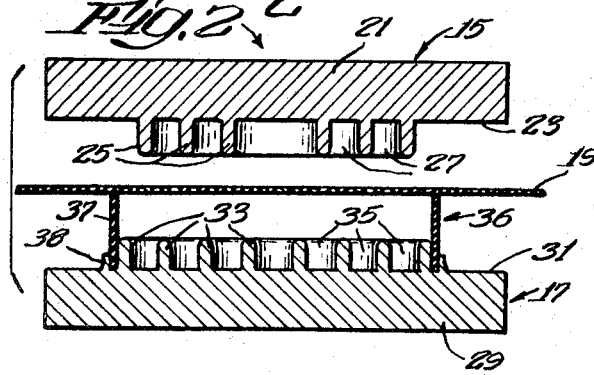
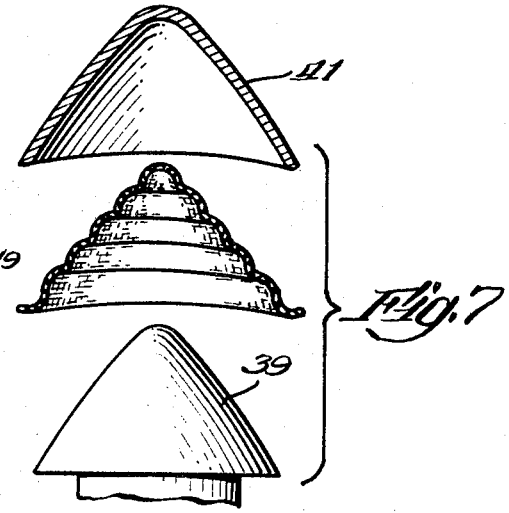
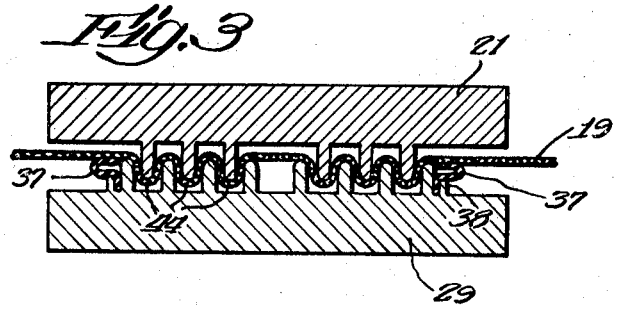

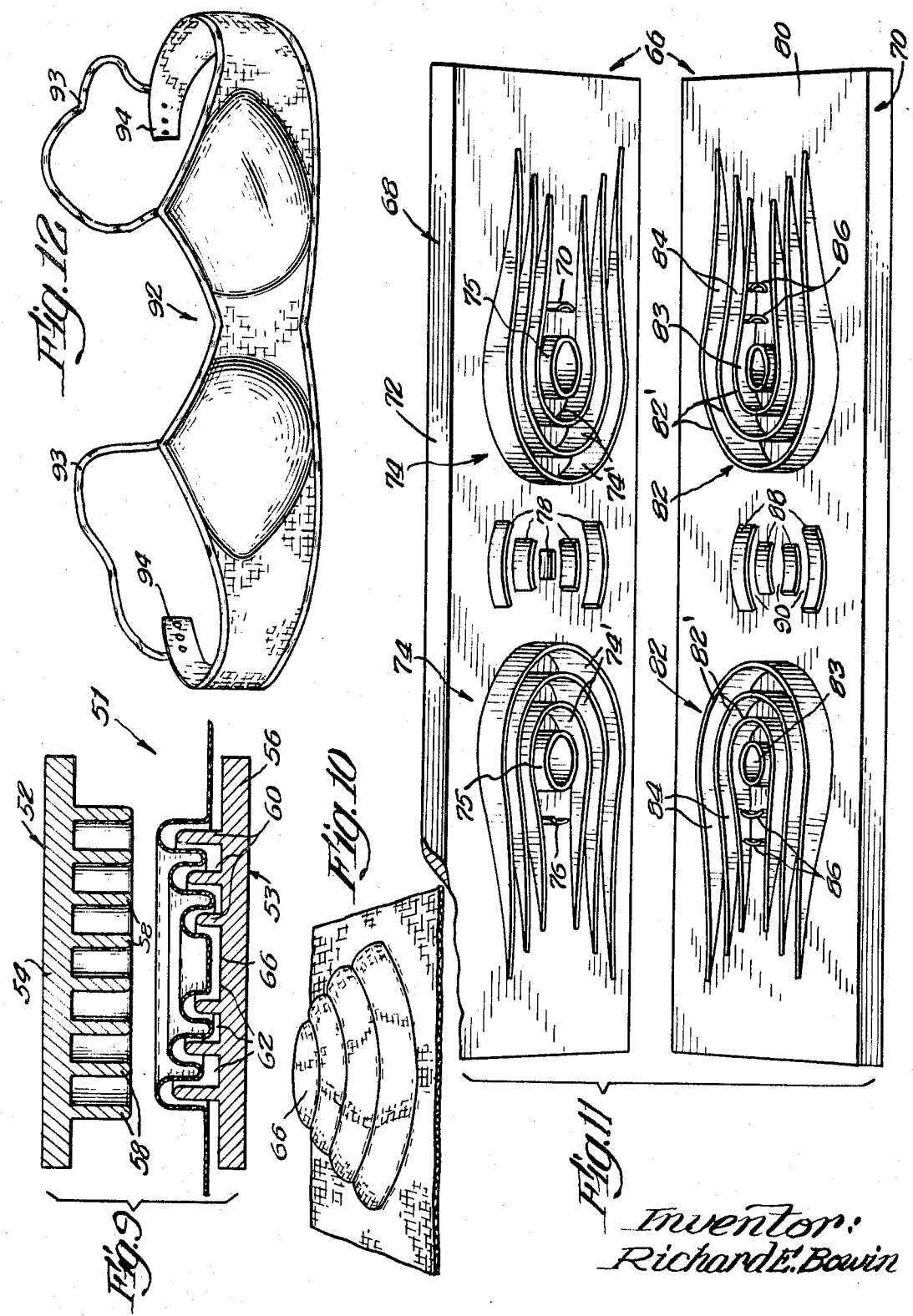

3,444,589
APPARATUS FOR FORMING SHEET MATERIAL TO PROVIDE THREE-DIMENSIONAL SHAPES
Richard E. Bowin, 6933 N. Kedzie Ave., Chicago, Ill. 60645
Filed Nov. 29, 1965, Ser. No. 522,003
Int. Cl. B29c 1/00; A41c 3/00
U.S. Cl. 18—19                                             11 Claims

ABSTRACT OF THE DISCLOSURE

An apparatus for providing an embossment or preform in a flat sheet, which embossment or preform is subsequently re-formed to form a three-dimensional shape having a configuration different from but as a result of the embossment. The apparatus comprises a pair of die members, with each having a plurality of spaced ribs providing spaced grooves between the spaced ribs and the ribs having surfaces to permit sliding or shifting of the sheet thereon, with the ribs of each die member interfitting and entering the grooves of the other die member. The flat sheet is adapted to be positioned between the two die members. The grooves have a width greater than the width of the cooperating rib and the portion of the sheet entering the groove so as not to impede stretching of the sheet, so that when the die members are forced together under pressure the ribs of each die member will enter the grooves of the other, with the portions of the sheet engaging the surfaces of the ribs shifting or sliding over the surfaces of the ribs to stretch that portion over the surfaces of the ribs, as well as the portions within the grooves, to form respective segments between cooperating grooves and ribs, with uniform stresses within the segments to form a plurality of radially tangent stretched segments, the stretched segments becoming the segments of the re-formed three-dimensional shape.

This invention relates to apparatus for forming sheet material to provide three-dimensional shapes and, more particularly, to apparatus particularly adapted to stretch form a fabric sheet into a conical or hemispherical shape suitable for use as a seamless layer for the breast cup of a brassiere.

Various three-dimensional shapes are frequently formed from sheet material. For example, in the fabrication of brassieres, a sheet of fabric is frequently formed into a hollow conical or hemispherical shell which is suitable for use as a breast cup. In the fabrication of other items such as wash basins, containers, and vehicle bodies, a metal or other relatively rigid material is formed to provide articles or portions thereof having various shapes.

In one method of forming sheet material to provide a three dimensional shape, the sheet material is cut into sections of a particular shape, these sections being then secured together along their edges, as by stitching when the sections are formed of fabric, or welding, brazing, riveting, or soldering when the sections are formed of metal. Very often, however, the presence of seams along which the sections are joined makes this method undesirable. For example, it has been found that seams in a brassiere breast cup are noticeable under outer garments. Certain colors of brassieres and outer garments accentuate this effect, as do garments tailored from particular types of fabric. Therefore, brassiere breast cups which are seamless are preferred.

Seamless fabrications have been achieved by a drawing process in which the flat sheet is placed between a male and female die, the dies having generally the shape which it is desired to impart to the sheet. Usually, a series of die sets is used to gradually reduce the sheet to the desired shape, with an annealing process sometimes being employed between each step. While this process is effective, it has been found that in the formation of shells of certain shapes the use of such male and female dies tends to produce a shell having a non-uniform wall thickness or density.

The formation of conically shaped fabric shells such as might be used in brassiere breast cups by the use of a conical male die and a female die having a conical cavity, provides a cup in which the walls are thinner adjacent the apex than adjacent the base. This is due primarily to the fact that when the conical male die engages a sheet and pressure is applied thereto, a stress is created in the sheet which is greater adjacent the center where engagement by the male die occurs than adjacent the periphery where the sheet is engaged by the female die.

Non-uniform wall thickness is undesirable in a breast cup since it renders the cup incapable of achieving the desired height and shape and causes certain areas of the wall of the cup to be weaker and less dense than other areas, thus causing the cup to provide non-uniform appearance and support. The non-uniform wall thickness also occasionally affects the appearance of the garment since the thinner portions of the cup have a different translucence than the thicker portions. This variation is noticeable when certain forms of outer garments are worn.

Apparatus of specific embodiments of the present invention are hereinafter described by way of example which are effective to provide a three dimensional conical or hemispherical brassiere breast cup layer from a sheet of fabric, i.e., to form a shell capable of serving as one layer in a brassiere having one of several layers. However, it should be understood that the method and apparatus described might be employed in shaping three dimensional shapes other than brassiere cups with other forms of material such as metal, plastics, etc., and that other shapes and configurations might be provided without departing from the scope of the invention.

The disadvantages hereinbefore pointed out with respect to the methods and apparatus presently employed are all overcome by the use of the methods and apparatus forming this invention.

In the drawings:

FIGURE 1 is an exploded view showing the die members and the fabric sheet employing the method and apparatus of this invention.

FIGURE 2 is a sectional view taken on line 2—2 of FIG. 1.

FIGURE 3 is a view similar to FIGURE 2 but with the dies in engagement and with the fabric sheet between the dies.

FIGURE 4 is a perspective view of a portion of the lower die.

FIGURE 5 is a view of the configuration of the sheet when the die members are opened and when the sheet is supported by the lower die.

FIGURE 6 is a view of the configuration of the sheet of FIGURE 5, which the sheet assumes at it is removed from the die.

FIGURE 7 is an exploded view showing the sheet of the configuration of FIGURE 6 positioned between the male and female dies to produce the shape shown in FIGURE 8.

FIGURE 8 is a cross-sectional view of the breast cup.

FIGURE 9 is a sectional view of a modification in which the dies are modified from those shown in FIGURES 1 to 4.

FIGURE 10 is a view of the sheet formed from the dies shown in FIGURE 9.

FIGURE 11 is a view of another modification showing an apparatus for shaping a sheet into a layer for a brassiere which includes a pair of breast cups, and FIGURE 12 is a perspective view of a one-piece molded brassiere formed from the apparatus shown in FIGURE 11.

Very generally, an apparatus 13 of the present invention which employs the method of the invention in providing a seamless brassiere breast cup layer, as illustrated in FIGURES 1–4, comprises a pair of mating dies 15 and 17 adapted to engage opposite sides of a sheet 19 of fabric and form it into the desired shape. The die 15, which is shown in the uppermost position in FIGURES 1 through 3, includes a plate 21 having a lower surface 23 provided with a series of depending projections 25 in the form of concentric annular rings which define grooves 27 therebetween. The die 17, which is shown in the lowermost position in FIGURES 1 through 3, is similar in construction to the die 15 and includes a plate 29 having an upper surface 31 provided with a series of upstanding projections 33 defining grooves 35 therebetween. The projections 25 and 33 are so dimensioned that when the dies are brought together, the projections of one are received into the grooves of the other. When a sheet 19 is located between the mating dies, the projections urge the sheet into the grooves and, in so doing, stretch form the sheet, as hereinafter described. Means 36 are provided adjacent the periphery of the dies for restraining movement of the sheet 19 during the stretch forming of the sheet.

In the use of the apparatus 13 in practicing the method of the invention to provide a seamless breast cup layer, the sheet 19 comprises a single ply thermoplastic fabric which is placed between the dies 15 and 17, as shown in FIGURES 1 and 2. However, the sheet 19 may include several plies of the same or different materials if desired. When the dies are brought into engagement with opposite sides of the sheet 19 under pressure, as shown in FIGURE 3, the means 36 restrains movement of the sheet as a whole while the projections 25 and 33 of the dies urge annular segments of the fabric into the grooves 27 and 35. Since the sheet is restrained, forcing of these annular segments into the grooves stretches these segments radially. Depending upon the nature of the sheet, heat may or may not be applied to the dies and/or to the sheet. When the sheet is removed from the dies, the portion of the sheet which has been stretched can assume a conical or hemispherical shape, as shown in FIGURE 6. This stretch-formed sheet is subsequently placed between conical male and female dies 39 and 41 (FIG. 7), which may or may not be heated, to impart to the formed fabric a smooth appearance, as shown in FIGURE 8.

More specifically, the dies 15 and 17 are preferably arranged one above the other in the positions shown in FIGURES 1 through 3 so that the sheet 19 to be formed can be laid upon and supported by the bottom die 17 (FIG. 2), the die 15 being then brought downwardly into engagement with the sheet (FIG. 3). Preferably, the die 15 is guided in its movement to insure proper alignment of the dies when closed. The die 15 may thus be caused to travel on guide rods (not shown), or the dies 15 and 17 may be affixed to the movable head and bed respectively of a suitable press which incorporates guides.

The plates 21 and 29 of the dies 15 and 17 respectively, are preferably each formed of aluminum or other material having good heat transmitting characteristics to facilitate the heating of the sheet 19 during forming under certain circumstances, as when the sheet 19 is formed of a thermoplastic material. In this regard, each plate contains electric heating coils (not shown) connected by means of wires 43 to a suitable source of electrical energy. It would also be possible, of course, to form the plates 21 and 29 of an insulating material provided the projections 25 and 33 are formed of a heat-conducting material and are arranged in heat-conducting relation to the heating coils. Such an arrangement may be preferred in certain applications.

The surface 23 of the plate 21 of the upper die 15 is provided with a series of concentric annular recesses, each of which receives one of the annular or ring-shaped projections or ribs 33 of the lower die when the two dies meet. In the illustrated embodiment, three concentric ribs 25 are provided in the upper die 15, but a greater or lesser number might be employed depending upon the shape being imparted to the fabric, the size of the area being formed in the fabric, etc. The concentric ribs 25 are preferably formed of a material such as aluminum, having good heat transfer characteristics. In one embodiment of an apparatus similar to that illustrated in FIGURES 1–3, and particularly adapted to form a brassiere breast cup layer, each concentric rib 25 projects a distance of approximately one inch past the surface 23 of the plate 21; however, the height of the ribs relative to the surface of the plate may be varied, and all of the projections or ribs of any one die need not necessarily be of uniform height, as discussed more fully hereinafter in connection with the modification shown in FIGURE 9.

The surface 31 of the bottom plate 29 is provided with a series of annular concentric recesses, each of which receives one of the annular ribs or projections 33. In the illustrated embodiment, four concentric ribs 33 are provided on the plate 29 and define three grooves 35 therebetween, each groove being adapted to receive one of the ribs 25 of the upper die 15. The ribs 33 of the lower die 17, like the ribs 25 of the upper die 15, are formed of aluminum, are of equal height, and are in heat conducting relation with heating coils (not shown) within the plate 29.

In the illustrated embodiment, the restraining means 36 comprises a flexible ring 37 projecting upwardly from the surface 31 of the lower plate a distance somewhat greater than the height of the ribs 33 of the lower plate. In the illustrated embodiment, the ring extends upwardly a distance slightly greater than the combined height of the ribs 25 of the upper plate and the ribs 33 of the lower plate so that the upper edge of the ring 37 will engage the surface 23 of the plate 21 of the upper die 15 before the ribs 25 of the upper die commence to enter the grooves 35 defined by the ribs 33 of the lower plate 29. As illustrated, the flexible ring 37 is clamped to the outer rib 33 of the lower plate 29 by a metal ring 38 and receives its support from the rib (FIG. 4).

In the use of the apparatus 13, as shown in FIGURE 2, the sheet 19 of material to be formed is placed between the dies 15 and 17, preferably by draping the sheet 19 across the upper edges of the ribs 33 and the flexible ring 37 of the lower die 17 with the sheet essentially wrinkle-free. The dies are then brought together, as by lowering the upper die, as in FIGURE 3. This initially causes the upper edge of the flexible ring 37 to engage the lower surface 23 of the upper plate and, with further movement, to be flexed until its edge has moved into engagement with the outermost rib 25 of the upper plate 21 at the base of the rib. The sheet 19 is thus locked between the ring 37, the rib 25, and the surface 23 of the plate 21 and is restrained from further shifting movement. More importantly, the edge portions of the sheet are thus prevented from being drawn inwardly toward the centers of the dies, an occurrence which would cause the sheet to be tucked into the grooves 27 and 35 without stretching. The restraining means 36 thus maintains the sheet taut over the edges of the ribs 33 of the lower die 17.

As the dies are closed to the position shown in FIGURE 3, the ring 37 bows outwardly while annular segments of the sheet spanning each pair of adjacent ribs 33, such as, for example, the segments desginated by the numeral 44 in FIGURE 3, are engaged centrally by a complementary rib 25 of the upper die 15 and are forced downwardly into the grooves 35 of the lower die 17. The ribs 33 of the lower die are simultaneously received within the grooves 27 of the upper die. Since the sheet 19 is restrained against shifting movement by the restraining means 36, the urging of the sheet segments into the grooves 35 effects a radial stretch of the segment 44 as a result of stresses set up within the segments transverse to the side edges thereof. The stretching is essentially uniform throughout the area of the segment since the circumference of any rib 33 of the lower die 17 closely approximates that of the complementary rib 25 of the upper die 15. Thus, the cross-sectional area of the segment along one edge closely approximates the cross-sectional area along the opposite edge, causing the segment to be subjected to essentially uniform stress from one edge to the other.

When the sheet is formed of certain materials, it may be desirable to heat the sheet either prior to forming or during forming, as by heated dies. For example, when a thermoplastic fabric is being used, the dies are preferably heated or the fabric is heated so that the thermoplastic fabric will be semi-fluid to allow for stretch, and so that the fabric of the sheet is set in its stretched condition and will not return to its original form when the dies are separated. This permanent forming is particularly important in the fabrication of garments such as brassieres which are subjected to repeated washings and, frequently, to drying under heated conditions in automatic appliances. However, it is to be understood that the stretch forming may be accomplished without heating the dies and that this step is presented only to illustrate a preferred method when stretch forming a thermoplastic fabric. Thus, sheets formed of an easily deformable material may be formed without the addition of heat and without rendering the material flowable or without necessarily even stretching the material itself.

When the dies are opened, the sheet 19 is found to have a configuration essentially like that seen in FIGURE 5, as supported by lower die 17. When removed from the die, the sheet assumes a configuration such as is shown in FIGURE 6. When the sheet is so formed, the annular segments 44 have been stretched radially and thus occupy a larger area. An upstanding embossment or shell of generally conical or hemispherical shape is thus created.

After the sheet is formed, as illustrated in FIGURE 5, some slight irregularities or corrugations may be visible in the surface of the shell. To provide the stretch-formed sheet with a smooth, attractive appearance, it is then preferably placed between the complementary male and female dies 39 and 41 respectively, such as are shown in FIGURE 7. The male die 39 is generally of a solid metallic construction in the shape of a cone and is preferably formed of a material such as aluminum having a high thermal conductivity. It is provided with an internal electrical heating element (not shown) connected by means of suitable electrical conducting wires to a suitable source of electrical energy. The female die 41 is also of metallic construction and defines a hollow cavity adapted to receive the male die 39.

When the cup or shell is placed between the dies 39 and 41 and heat and pressure are applied thereto, the corrugations are flattened to provide the finished form shown in FIGURE 8. It should be clear, however, that the formed cup or shell placed between the dies 39 and 41 already has the general shape of the dies and that the dies are not required to stretch or form the sheet. It should also be clear that dies similar to the dies 39 and 41 might be employed when metallic or other rigid sheets are being formed, except that the use of heat may not be necessary.

It should be apparent from the foregoing that the principle employed in the above-described method of the invention can be utilized to provide embossments of various shapes and configurations other than that shown in FIGURES 6 and 8 by varying, for example, the number of projections or ribs and grooves, the depth of the penetration of the ribs into the grooves, and the shape of the ribs and grooves. One such variation is illustrated in FIGURE 9, which shows an apparatus 51, including upper and lower dies 52 and 53. The upper die has an upper plate 54 and the lower die has a lower plate 56. The upper plate 54 is provided with four concentric annular ribs 58 which are of uniform height and are placed uniformly from each other. The lower plate 56 is provided with three annular projections or ribs 60 spaced so as to define grooves 62 into which the ribs 58 of the upper plate 54 are received. The ribs 60 of the lower plate are not of uniform height but, instead, decreases in height toward the center of the plate.

Thus, although each of a plurality of annular segments of the sheet may be stretched radially uniformly throughout its area by the apparatus 52, each segment is subjected to a different degree of stress than the adjacent segment. More specifically, the outermost segment is subjected to the greatest degree of stress, with each inner segment being subjected to a progressively lesser degree of stress. The central portion 66 of the sheet will be generally flat. Thus, the sheet assumes a more generally truncated shape than with the apparatus 13, with the center of the formed cup being substantially flat.

Another embodiment of the invention is illustrated in FIGURE 11 which shows an apparatus 66 particularly adapted to shape a sheet of fabric into a layer for a brassiere, the sheet being so formed as to include a pair of breast cups. More specifically, the apparatus 66 comprises an upper die 68 and a lower die 70. The upper die 68 includes a plate 72 provided with two spaced sets of dependent projections or ribs 74. Each set 74 includes a rib 75 of relatively small diameter and annular configuration surrounded by ribs 74' which are somewhat U-shaped so as to be open on the outer side away from the ribs of the opposite set. A post 76 is provided adjacent the outer side of the central annular rib in spaced relation thereto. The non-annular ribs 74' decrease in height toward the outer side. The central portion of the plate intermediate the sets or ribs 74 is provided with a set of depending posts 78 which are of uniform height but of varying length. Restraining means such as or similar to the means 36 of the principal embodiment may be provided where necessary.

The lower die 70 is similar to the upper die 68 and includes a plate 80 provided with two spaced sets of upstanding projections or ribs 82, each of which includes a central generally annular rib 83 and a series of somewhat U-shaped ribs 82' defining grooves 84 adapted to receive the ribs 74' of the upper die 68. The lower die 70 also includes a pair of spaced posts 86 positioned adjacent the central annular rib 83 of each set 82, and includes posts 88 defining grooves 90 adapted eo receive the posts 78 of the upper die 68.

The purpose of the posts 78 and 88 is to stretch the sheet between the breast cups and to stretch it to substantially the density of the adjacent breast cups.

The brassiere in FIGURE 12 is formed from the apparatus shown in FIGURE 11. When the dies 68 and 70 are brought together under pressure, they form a fabric sheet of one or more plies as to render it suitable for use as a brassiere. When the die members 68 and 70 are opened, the sheet will have a configuration of two spaced series of embossings of somewhat U-shaped segments conforming to the shape of the ribs 74 and 82. The sheet would be like that shown in FIGURE 5, except that instead of the segments being concentric or annular as shown in said figure, the segments would be U-shaped and there would be two of them in a spaced relationship. Thus, the sheet is provided with a pair of breast cups which are suitably contoured so as to blend in with the remainder of the garment or to make the whole garment.

When the sheet is removed from the dies each breast cup assumes a shape generally similar to that shown in FIGURE 6, and this may be the finished product such as shown in FIGURE 12. If desired, the sheet with the two formed breast cups may be placed between a pair of male and a pair of female dies, similar to FIGURE 7, which further presses and sets the breast cups. The sheet of material is then cut to the outline shape shown in FIGURE 12. Thus, the body and breast cups of the brassiere 92 may be molded from a one-piece sheet and may be molded or formed by the apparatus of FIGURE 11. Shoulder straps 93 and suitable fastening elements 94 may then be sewn to the formed sheet to complete the brassiere.

The dies of apparatus 51 and 66 are formed of the same material as the dies previously described and are heated in the same manner.

Formation of the garment in this manner eliminates the need for stitching cups separately to a panel.

FIGURES 1 to 4 and FIGURE 9 show concentric ribs, while FIGURE 11 shows generally U-shaped ribs. It will be understood that oval shaped ribs, or ribs of other configurations, or ribs of intermittent continuity may be used in forming the breast cups. Also, to vary the stretch the stretch of the material, the ribs may be higher or shorter than that shown. The extent of the closing of the dies also determines the stretch of the material.

In the FIGURE 11 apparatus it will be seen that the ribs taper or decrease from the center to the outside. With such a formation of ribs the breast cup formed will have a different angle on the side adjacent the center than the outside of the cups.

While this invention has been described in connection with a brassiere, it will be understood that it may be used in making shapes and forms in connection with other garments, such as slips, swim wear, and other articles.

An apparatus is thus provided for forming sheet material to provide a variety of raised shapes and configurations. While the method and apparatus have been described with respect to certain specific embodiments thereof, it should be apparent that various modifications may be made therein without departing from the spirit and scope of the appended claims.

What is claimed is:

1. An apparatus for providing an embossment or preform in a flat sheet, which embossment or preform is subsequently re-formed to form a three-dimensional shape having a configuration different from but as a result of the embossment or preform, said apparatus comprising a pair of die members, each die member having a plurality of spaced ribs providing spaced grooves between the spaced ribs, said ribs having surfaces to permit sliding or shifting of the sheet thereon, the ribs of each die member interfitting and entering the grooves of the other die member, said flat sheet being adapted to be positioned between the two die members, said grooves having a width greater than the width of the cooperating ribs and the portions of the sheet entering the grooves so as not to impede stretching of the sheet, means for forcing said members together under pressure to cause the ribs of each die member to enter the grooves of the other and with the portions of the sheet engaging the surfaces of the ribs shifting or sliding over said surfaces to stretch said portions over said surfaces as well as the portions within the grooves to form respective segments between cooperating grooves and ribs with uniform stresses within the segments to form a plurality of radially tangent stretched segments, the stretched segments becoming the segments of the re-formed three-dimensional shape.

2. An apparatus as defined in claim 1 in which at least one of the dies has means for restraining the sheet during the stretching thereof.

3. An apparatus as defined in claim 1 in which the ribs and grooves are concentric to form concentric stretched segments.

4. An apparatus as defined in claim 2 in which the restraining means comprises a flexible memebr of a height greater than the ribs of the die to which it is attached to be engaged by the other die to cause the flexible member to flex and engage the sheet to restrain the sheet from bodily shifting movement.

5. An apparatus as defined in claim 1 in which the stretched segments form a generally hollow conical or hemispherical shell.

6. An apparatus as defined in claim 1 in which the ribs of at least one die member are not of uniform height.

7. An apparatus as defined in claim 1 in which the ribs and grooves are generally U-shaped.

8. An apparatus as defined in claim 7 in which the ribs taper or decrease from the center to the outside.

9. An apparatus as defined in claim 1 in which the sheet is a fabric and in which the stretched segments form a breast cup.

10. An apparatus as defined in claim 7 in which the sheet is a fabric and in which the stretched segments form a breast cup.

11. An apparatus as defined in claim 1 in which the sheet is a fabric and in which the stretched segments form a garment or section of a garment.

References Cited

UNITED STATES PATENTS

| 3,135,998 | 6/1964 | Fowler et al. | 18—19 |
| 3,258,814 | 7/1966 | Harrison | 18—19 |
| 3,270,104 | 8/1966 | Dreyfus et al. | 18—19 X |
| 3,295,168 | 1/1967 | Gale et al. | 18—19 |

FOREIGN PATENTS 722,539  11/1965  Canada.

WILBUR L. McBAY, *Primary Examiner.*

U.S. Cl. X.R.

264—294